Patented Apr. 16, 1929.

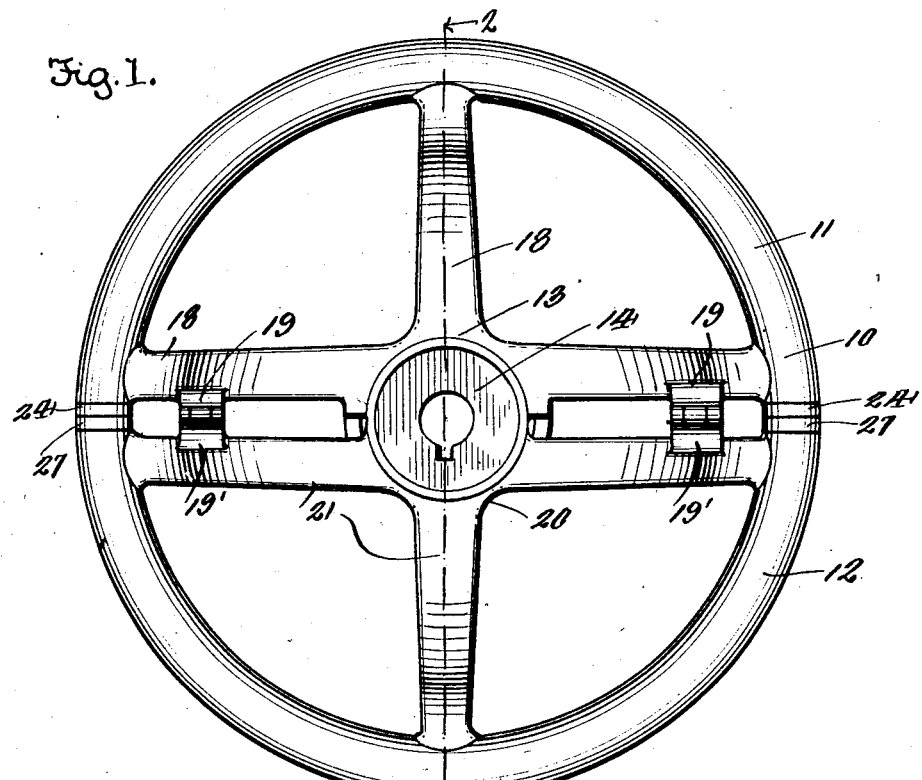
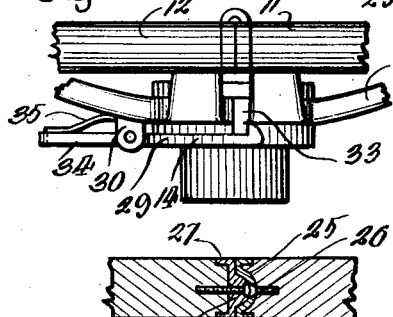
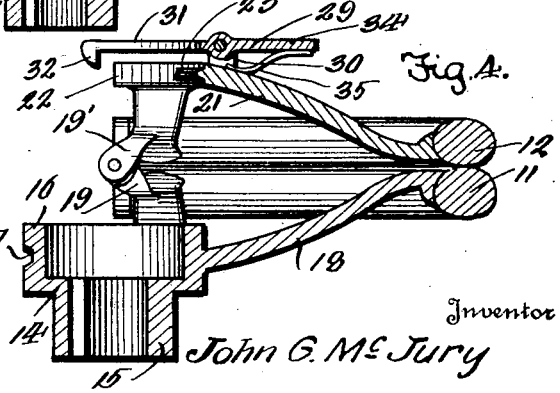

1,709,085

UNITED STATES PATENT OFFICE.

JOHN G. McJURY, OF BATAVIA, NEW YORK.

TILTABLE STEERING WHEEL.

Application filed January 13, 1927. Serial No. 160,942.

The present invention relates to improvements in steering wheels for vehicles and has particular reference to steering wheels of the foldable type.

An important object of the invention is to provide a steering wheel arranged so that a portion may be tilted or swung to folded position so that the driver may conveniently enter and leave the vehicle.

A further object of the invention is the provision of a steering wheel of the above type arranged so that practically one half of the wheel may be swung upwardly so as to provide a maximum space for the occupation of the vehicle driver's seat.

Still another object of the invention is the provision of a steering wheel embodying a rigid section and a hingedly connected swinging section arranged to be tightly secured in operative position so as to provide a relatively rigid complete steering wheel in operative arrangement.

Another object of the invention is the provision of a steering wheel of the above character which is comporotively simple and durable of construction, efficient for the purpose intended and which can be manufactured at a relatively low cost.

Other objects and advantages of the invention will become apparent as the description progresses.

In the accompanying drawing forming a part of this specification and in which like reference characters are employed to designate corresponding parts throughout the same:

Figure 1 is a top plan view of a steering wheel constructed in accordance with my invention shown in operative position, Figure 2 is a transverse sectional view taken on the line 2—2 of Figure 1, Figure 3 is a fragmentary side elevational view of the wheel, Figure 4 is a transverse sectional view illustrating the wheel in folded position, and Figure 5 is a transverse sectional view taken through the connected sides of the wheel.

Referring to the drawing wherein for the purpose of illustration is shown the preferred embodiment of my invention, the numeral 10 generally designates the wheel rim which is composed of a pair of complementary sections 11 and 12. The sections are divided on the transverse center line of the rim to provide semi-circular rim sections of wooden or any preferred construction.

The rim section 11 mounted on the stationary section of the wheel embodies a spider frame 13 embodying a hub 14 comprising a lower reduced sleeve 15 arranged for detachable engagement with the upper end of a steering column and an upper enlarged sleeve 16 provided at its outer peripheral side with a semi-circular groove 17, the purpose of which will become apparent as the description progresses. The spider 15 also embodies a plurality of radially directed spokes 18 formed integral with and rigidly secured to the hub 14 and secured to the rim section 11. In the present embodiment of the invention the spider 13 embodies three spokes, a pair extending in rectilinear positions from the hub and secured to the rim section 11 adjacent the ends thereof. The third or intermediate spoke projects at a right angular position from the hub and is spaced intermediate the ends of the rim. As indicated in Figure 2, the spokes 18 are preferably offset so as to support the rim 10 in a relatively elevated position with respect to the hub 14. Formed integral with or rigidly secured to the outer edges of the end spokes of the stationary section are outwardly directed hinge sections 19 formed with spaced hinge sleeves in co-acting engagement with opposed hinge sections which will be more specifically described hereinafter.

The tiltable or foldable section of the wheel embodies a spider 20 comprising radially extending spokes 21 arranged in the same relative positions as the spokes of the spider 13. This construction therefore provides rectilinear spokes 21 arranged parallel with the rectilinear spokes 18 of the stationary spider and in spaced relation thereto in the normal condition of the wheel. Formed on the outer edges of the rectilinear spokes 21 in opposed positions to the hinged sections 19 are complementary hinge sections 19' formed with a centrally arranged hinge sleeve disposed between the hinge sleeves on the sections 19 and connected by a hinge pin to complete the hinge structure. The central portion of the spider 21 is formed with an arcuate substantially semi-circular hub 22 adapted to snugly fit against one side of the enlarged hub sleeve 16. The spider hub 22 is formed with an arcuate tapered tongue 23 adapted to engage in the groove 17 in the normal positions of the sections.

Secured to the ends of the rim section 11 are circular end caps 24 formed with concave sockets 25 and rigidly secured in position by screws 26. The ends of the complementary rim section 12 carry similar end caps 27 formed with convex dowels 28 engageable with the sockets 26 when the sections are arranged in normal position. In this construction, it is obvious that the wheel section 12 is tiltable or foldable in an upward arc with respect to the steering column and stationary section 11 and may be arranged in a folded position above the stationary section as shown in Figure 4.

In order that the wheel sections may be rigidly connected when arranged in unfolded or normal position, I provide an automatically engageable locking mechanism embodying a latch member 29 pivotally supported in a bracket 30 formed on the inner end portion of the intermediate spoke 21 of the swinging section. The outer portion of the latch member is formed to provide a substantially semi-annular yoke 31 the ends of which are formed with right-angular latch heads 32. These latch heads are automatically engageable with laterally projecting keeper lugs 33 formed on the main hub 14. The rear portion of the latch member 29 is formed with an outwardly directed finger bar 34 normally urged away from the section by means of a leaf spring 35 secured to the intermediate spoke of the section. Thus, to disengage the latch member the operator need merely elevate the bar 34 of the latch member to release the yoke thereof and permit tilting or folding movement of the movable section. When it is desirable to return the movable section to its normal position, the section is swung downwardly to the plane of the fixed section of the wheel and the latch member 29 will automatically engage the keeper lugs and lock the sections together.

From the foregoing description and the drawing, it will be readily apparent that the present construction provides a durable steering wheel embodying a fixed or rigid section normally disposed in a forward position when the front wheels of the vehicle are in straight forward alignment, and a tiltable section which can be readily folded to an upright position or to a position folded upon the rigid section so that the operator may conveniently occupy the driver's seat. An important characteristic of the present steering wheel structure is the provision of a wheel which will be reliable in use so as to avoid the possibility of accidental displacement of the foldable section of the wheel. This structure presents a wheel which can be conveniently folded and obviates the formation of projections which might interfere with the convenient steering operation and at the same time presents a steering wheel which will be rigid and secure in its operative position.

It is to be understood that the form of my invention herewith shown and described is to be taken as the preferred example of the same and that various changes as to the shape, size, and arrangement of parts may be restorted to without departing from the spirit of the invention or the scope of the subjoined claims.

Having thus described my invention, I claim:

1. A steering wheel of the class described comprising a pair of companion sections, one of said sections comprising a hub for attachment to a steering column, spokes radiating from the hub, and a rim of substantially semi-annular form supported by the spokes, the hub having a seat formed circumferentially therein at the side opposite the side from which the spokes extend, the other section of the wheel comprising an arcuate hub portion hingedly connected with the hub of the first mentioned section and formed to embrace the said side of the hub of the first mentioned section, spokes radiating from said hub portion, and a substantially semi-annular rim supported by the spokes, the said hub portion of the adjustable section having a locking tongue seating in the seat in the hub of the first mentioned section, a latch upon the said adjustable section, and a keeper upon the hub of the fixed section engageable by said latch.

2. A steering wheel of the class described comprising a pair of companion sections, one of said sections comprising a hub, spokes radiating therefrom, and a substantially semi-annular rim section supported by said spokes, the other section comprising an arcuate hub portion hingedly connected with the hub of the first mentioned section, spokes radiating therefrom, a substantially semi-annular rim section supported by said spokes, means upon the hub of the first mentioned section and the hub portion of the second mentioned section for interlocking engagement when the adjustable section is adjusted to occupy a position in a plane with the fixed section, a keeper upon the hub of the first mentioned section, and a latch upon the hub portion of the second mentioned section for locking engagement with said keeper.

3. A steering wheel of the class described comprising a pair of companion sections, one of said sections comprising a hub for attachment to a steering column and a rim of substantially semi-annular form supported concentric to the hub, the other section comprising a hub portion hingedly connected with the hub of the first mentioned section and formed to partly embrace the said hub of the first mentioned section when the second mentioned section is adjusted to a position in a plane with the first mentioned section, keeper lugs projecting from diametrically opposite sides of the hub of the first mentioned section, and a latch member pivotally mounted upon the hub portion of the second mentioned section and having arcuate latch arms embracing the hub of the first mentioned section and provided with latch heads engageable with respective ones of said keepers in the said position of adjustment of the second mentioned section.

In testimony whereof I affix my signature.

JOHN G. McJURY.